United States Patent [19]

Hurlburt

[11] 3,727,467
[45] Apr. 17, 1973

[54] SPEED REDUCING BEARING ARRANGEMENT FOR A MECHANICALLY ERECTED VERTICAL GYRO

[75] Inventor: Charles E. Hurlburt, River Edge, N.J.

[73] Assignee: The Bendix Corporation, Teterboro, N.J.

[22] Filed: June 10, 1971

[21] Appl. No.: 151,655

[52] U.S. Cl. .......................... 74/5.41, 74/5, 308/183
[51] Int. Cl. .............................................. G01c 19/30
[58] Field of Search .......................... 74/5.41, 5.47, 5, 74/5.45, 5.46; 308/183; 310/90

[56] References Cited

UNITED STATES PATENTS

| | | | |
|---|---|---|---|
| 3,336,811 | 8/1967 | Klemes et al. | 74/5 |
| 3,336,810 | 8/1967 | Schaffer et al. | 74/5 |
| 3,269,194 | 8/1966 | Buckley | 74/5 |
| 2,603,094 | 7/1952 | Wrigley | 74/5.47 |
| 3,225,606 | 12/1965 | Stiles | 308/183 X |
| 2,577,942 | 12/1951 | Agins | 74/5 |
| 2,979,367 | 4/1961 | Mims et al. | 310/90 X |
| 3,547,503 | 12/1970 | Konet | 308/183 |

FOREIGN PATENTS OR APPLICATIONS

| | | | |
|---|---|---|---|
| 445,974 | 1/1948 | Canada | 74/5.41 |
| 1,183,868 | 3/1970 | Great Britain | 308/183 |

Primary Examiner—Manuel A. Antonakas
Attorney—Plante, Hartz, Smith & Thompson

[57] ABSTRACT

A speed reducing bearing arrangement of the type including a dual bearing having a common race and separate complementing races and balls so selected that the contact angle of one complement of inner and outer race is different than the contact angle of the other complement of inner and outer race is used for coupling an erection mechanism for a mechanically erected vertical gyro to the gyro rotor for rotating the erection mechanism in the same direction as the rotor but at a greatly reduced speed.

3 Claims, 3 Drawing Figures

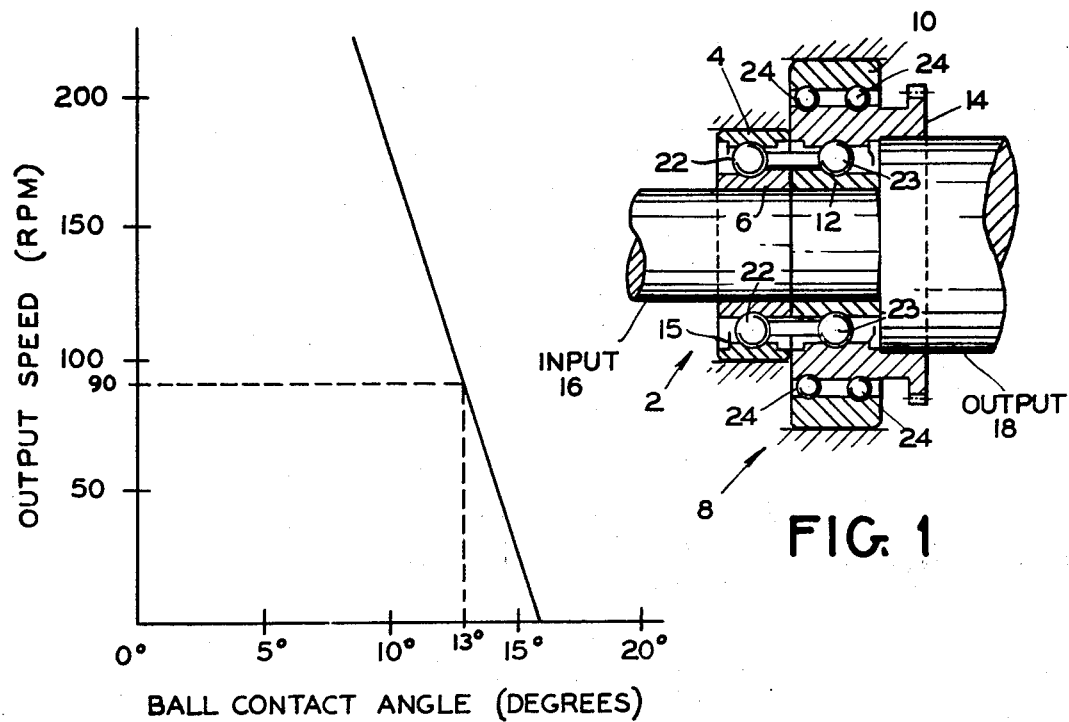
FIG. 1
FIG. 2
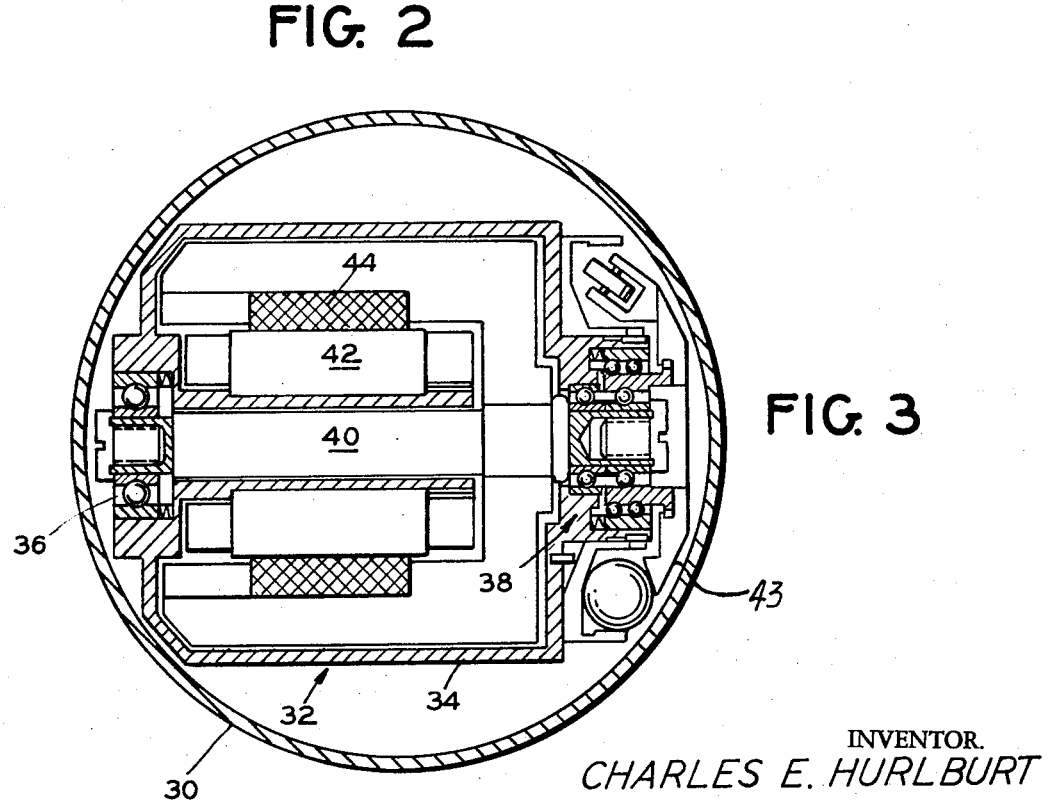
FIG. 3
INVENTOR.
CHARLES E. HURLBURT
BY
ATTORNEY

SPEED REDUCING BEARING ARRANGEMENT FOR A MECHANICALLY ERECTED VERTICAL GYRO

BACKGROUND OF THE INVENTION

1. Field of the Invention

This invention relates to speed reducing arrangements and more particularly, to ball bearing speed reducing arrangements for use with mechanically erected vertical gyros.

2. Description of the Prior Art

A mechanically erected vertical gyro commonly utilizes some means of rotating shifting masses, or rolling balls, around the gyro spin axis at a rotational speed which is a small fraction of the rotational speed of the gyro rotor. Prior to the present invention the reduction in speed has been accomplished by direct reduction gearing between the gyro rotor and the rotating erection mechanism, or by a loosely coupled drive actuated by a magnet (integral to the gyro) dragging, as a high slip eddy current motor, a conducting ring which is connected to the rotating erection mechanism. Such speed reduction devices have disadvantages in that the wear on the high speed gear on the gyro rotor is a limitation on gyro operating life. In the case of the eddy current motor drive, which is usually associated with a ratchet and pawl assembly, a somewhat bulky device results which uses a high proportion of available space which might be otherwise better used for the gyro rotor.

SUMMARY OF THE INVENTION

This invention contemplates a dual bearing speed reducing arrangement wherein the dual bearing has a common race and separate complementing races and balls so selected that the contact angle of one complement of inner and outer race is different from the contact angle of the other complement of inner and outer race. If one of the separate complementing races is stationary and the common race is operating at some high speed, the speed of the other separate complementing race with relation to the first such race is dependent upon the relative contact angle, which in turn is controlled by the selection of ball sizes. If contact angles for each complementary race are identical, both separate races have the same speed and if one of said races is stationary the other is likewise stationary. If the contact angles are different, i.e., one ball complement has balls of a slightly different diameter, than the other one of the separate races has a different rotational rate relative to the common race than the other separate race would have for every rotation of a common ball retainer. A gyro rotor is coupled to the bearing as an input member, whereby the erection system rotates in the same direction as the gyro but at a greatly reduced speed.

One object of this invention is to provide a speed reducing bearing arrangement for rotating a mechanical erection system used with a vertical gyro.

Another object of this invention is to provide a speed reducing bearing arrangement including a dual bearing having a common race, a common ball retainer and separate complementing races and balls so selected that the contact angle of one complement of inner and outer races is different from the contact angle of the other complement of inner and outer races.

Another object of this invention is to achieve speed reduction through providing balls of different size in the bearings, whereby changes in the contact angle of the balls achieves speed reduction.

Another object of this invention is to provide a gyro system of the type having a mechanical erection mechanism and including speed reducing means for coupling the erection mechanism to the gyro rotor for rotating said mechanism at a speed lower than that of the rotor.

Another object of this invention is to provide a speed reducing arrangement of the type described which is more efficient in operation than gear train speed reducers or eddy current type drives now known in the art.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a side view of a double bearing speed reducing arrangement according to the invention.

FIG. 2 is a graphical representation showing the speed reduction achieved by varying ball bearing contact angles.

FIG. 3 is a plan view of the speed reducing arrangement of FIG. 1 applied to a gyro device including a mechanical erection mechanism.

DESCRIPTION OF THE INVENTION

The ball bearing speed reducer shown in FIG. 1 includes a bearing 2 having a stationary outer race 4 and an inner race 6, and a bearing 8 having a stationary outer race 10, an inner race 12 and a middle race 14. Races 6 and 12 have a common ball retainer.

Inner race 6 of bearing 2 and inner race 12 of bearing 8 are coupled to a common input shaft or member 16 and have the same rotational speed. Middle race 14 of bearing 8 is coupled to an output shaft or member 18 having a speed lower than that of shaft 16 as will be hereinafter explained.

Inner race 6 and outer race 4 of bearing 2 are coupled to each other through balls 22, and inner race 12 and middle race 14 of bearing 8 are coupled to each other through balls 23 which are slightly smaller in diameter than balls 22. Middle race 14 and outer race 10 of bearing 8 are coupled to each other by balls 24.

Since balls 23 are smaller than balls 22, the contact angles between the balls and the respective races are unequal and the relative velocity of inner race 6 to outer race 4 of bearing 2 is different than the relative velocity of inner race 12 to middle race 14 of bearing 8 and middle race 14, therefore, has a velocity relative to the velocity of outer race 4. This relative velocity can be varied down to zero by slight changes in the contact angle of the respective balls in the bearing. As an approximation, the relative velocity ($\omega R$) is given by the following equation:

$$\omega_R = [1 - (d_A/d_B)] \omega; \qquad (1)$$

where $d_A/d_B$ is the ratio of the diameters of balls 22 and 23 and $\omega$ is the relative velocity of inner race 6 to outer race 4 of bearing 2. It will now be understood that the rotation of middle race 14 of bearing 8 can be clockwise or counterclockwise depending upon which of the balls 22 or 23 have the larger diameter.

With reference to FIG. 2, if the ball (22, 23) diameters are the same so that the contact angle is, for example, 15.46°, the relative speed of the two separate races is zero. If the contact angle of the second set of races is, for example, 13°, the relative speed of the two races would be 90 rpm as shown in the Figure. Thus, with the contact angles along the horizontal axis of the graphical representation of FIG. 2 and for a constant 24,000 rpm speed of input shaft 2, the speed of output shaft 18 may be plotted as shown.

As aforesaid, the application of the speed reducing bearing of the invention is particularly suited to a mechanical erection system for a vertical gyro. Thus, if the gyro rotor is coupled as an input member and a gyro erection mechanism of a type well known in the art, is coupled as an output member, the arrangement shown in FIG. 1 will cause the ball erection mechanism to rotate in the same direction as the gyro rotor but at a greatly reduced speed and in accordance with the graphical representation of FIG. 1.

This arrangement is described with reference to FIG. 3, wherein there is shown a case or can 30 housing a vertical gyro 32. Gyro 32 includes a gimbal 34 carrying a conventional type bearing 36 at one end and a dual bearing arrangement 38 according to the invention at the other end. The bearings support a gyro motor in the gimbal, and which motor includes a shaft 40 journaled in the bearings and supporting a rotor 42 surrounded by a stator 44.

Shaft 40 is coupled by conventional means to bearing 38 as an input member and a ball erection mechanism 44 of a type well known in the art as coupled as an output member. In accordance with the aforegoing description of the invention, erection mechanism 44 rotates in the same direction as rotor 42, but at a greatly reduced speed.

It will now be seen from the aforegoing description of the invention that the device disclosed is more compact in size and more efficient in operation than gear train speed reducers or eddy current drives presently known in the art. The invention is particularly suited to a mechanically erected vertical gyro which utilizes some means of rotating shifting masses or rolling balls around the gyro spin axis at a rotational speed which is a small fraction of the rotational speed of the gyro rotor.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A gyro system, comprising:

a gyro motor including a rotor rotating at a predetermined speed;

mechanical erection mechanism;

a bearing assembly coupling the rotor to the erection mechanism for rotating said mechanism in a predetermined direction and at a speed other than the predetermined speed;

the bearing assembly including a first bearing having an outer race and an inner race and a second bearing having an outer race, an inner race and a middle race;

the gyro rotor being coupled to the inner races of the first and second bearings, and the erection mechanism being coupled to the middle race of the second bearing; and the inner and outer races of the first bearing coupled through balls of a predetermined diameter and the inner and middle races of the second bearing coupled through balls of a diameter slightly smaller than the predetermined diameter.

2. A gyro system, comprising:

a gyro motor including a rotor rotating at a predetermined speed;

a mechanical erection mechanism;

a bearing assembly coupling the rotor to the erection mechanism for rotating said mechanism in a predetermined direction and at a speed other than the predetermined speed;

the bearing assembly including a first bearing having an outer race and an inner race, and a second bearing having an outer race, an inner race and a middle race;

the gyro rotor being coupled to the inner races of the first and second bearings, and the erection mechanism being coupled to the middle race of the second bearing; and the outer races of the first and second bearings are stationary.

3. A gyro system, comprising:

a gyro motor including a rotor rotating at a predetermined speed;

a mechanical erection mechanism;

a bearing assembly coupling the rotor to the erection mechanism for rotating said mechanism in a predetermined direction and at a speed other than the predetermined speed;

the bearing assembly including a first bearing having an outer race and an inner race, and a second bearing having an outer race, an inner race and a middle race;

the gyro rotor being coupled to the inner races of the first and second bearings, and the erection mechanism being coupled to the middle race of the second bearing;

the relative velocity of the inner race to the outer race of the first bearing is different than the relative velocity of the inner race to the middle race of the second bearing; and the middle race of the second bearing has a velocity relative to the velocity of the outer race of the first bearing.

* * * * *